United States Patent
Kim et al.

(10) Patent No.: US 10,849,029 B2
(45) Date of Patent: Nov. 24, 2020

(54) METHOD FOR PERFORMING CELL RESELECTION PROCEDURE BY TERMINAL, AND APPARATUS SUPPORTING SAME

(71) Applicant: LG Electronics Inc., Seoul (KR)

(72) Inventors: Sangwon Kim, Seoul (KR); Youngdae Lee, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/346,681

(22) PCT Filed: Nov. 1, 2017

(86) PCT No.: PCT/KR2017/012257
§ 371 (c)(1),
(2) Date: May 1, 2019

(87) PCT Pub. No.: WO2018/084572
PCT Pub. Date: May 11, 2018

(65) Prior Publication Data
US 2020/0059835 A1    Feb. 20, 2020

Related U.S. Application Data

(60) Provisional application No. 62/416,671, filed on Nov. 2, 2016, provisional application No. 62/416,133, filed on Nov. 1, 2016.

(51) Int. Cl.
*H04W 36/00* (2009.01)
*H04W 76/27* (2018.01)
*H04W 36/08* (2009.01)

(52) U.S. Cl.
CPC ... *H04W 36/0058* (2018.08); *H04W 36/0007* (2018.08); *H04W 36/0044* (2013.01);
(Continued)

(58) Field of Classification Search
CPC ............. H04W 36/08; H04W 36/0061; H04W 36/0044
See application file for complete search history.

(56) References Cited

U.S. PATENT DOCUMENTS

2016/0080996 A1    3/2016    Fukuta et al.
2017/0013551 A1*   1/2017    Martin ................. H04W 48/18
(Continued)

FOREIGN PATENT DOCUMENTS

| WO | WO2016017091 | 2/2016 |
|----|--------------|--------|
| WO | WO2016025836 | 2/2016 |
| WO | WO2016144099 | 9/2016 |

OTHER PUBLICATIONS

Lee et al., "LTE-advanced in 3GPP Rel-13/14: an evolution toward 5G," IEEE Communications Magazine, Mar. 17, 2016, 54(3): 36-42.

*Primary Examiner* — Mohammad S Anwar
(74) *Attorney, Agent, or Firm* — Fish & Richardson P.C.

(57) ABSTRACT

Disclosed are a method for performing a cell reselection procedure by a terminal, and an apparatus supporting the same. The method comprises the steps of: measuring a first CE level in a serving cell where the terminal is currently staying; measuring a second CE level in a neighboring cell where an MBMS service of interest is provided; calculating a ranking of the neighboring cell by adding an offset to a quality value measured for the neighboring cell, when the second CE level is higher than or equal to the first CE level; and performing a cell reselection procedure on the basis of the calculated ranking.

13 Claims, 10 Drawing Sheets

(52) U.S. Cl.
CPC ....... *H04W 36/0061* (2013.01); *H04W 36/08* (2013.01); *H04W 76/27* (2018.02)

(56) References Cited

U.S. PATENT DOCUMENTS

2017/0265086 A1\* 9/2017 Worrall .................. H04W 4/70
2017/0353946 A1\* 12/2017 Rico Alvarino ........ H04W 4/70
2018/0049087 A1\* 2/2018 Lee ....................... H04W 24/08

\* cited by examiner

METHOD FOR PERFORMING CELL RESELECTION PROCEDURE BY TERMINAL, AND APPARATUS SUPPORTING SAME

CROSS-REFERENCE TO RELATED APPLICATIONS

This application is a National Stage application under 35 U.S.C. § 371 of International Application No. PCT/KR2017/012257, filed on Nov. 1, 2017, which claims the benefit of U.S. Provisional Application No. 62/416,671, filed on Nov. 2, 2016, and U.S. Provisional Application No. 62/416,133, filed on Nov. 1, 2016. The disclosures of the prior applications are incorporated by reference in their entirety.

BACKGROUND OF THE INVENTION

Field of the Invention

The present invention relates to technology in which a terminal performs a cell reselection procedure in consideration of efficiency of radio resources.

Related Art

The 3GPP LTE can provide a multimedia broadcast multicast service (MBMS) service. The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

Recently, various coverage enhancement techniques, such as a repeated transmission method for a UE per channel/signal, have been discussed. A coverage enhancement level (hereinafter, "CE level") may change depending on the location of a UE in a cell and the signal quality of the UE in the cell. A different CE level refers to a different number of repetitions (resources or subframes) required for successful uplink transmission and downlink reception. For a UE, it is advantageous in view of power consumption to stay in a cell requiring a smaller number of repetitions for successful uplink transmission and downlink reception. Therefore, a network needs to provide the number of repetitions required by a UE so that the UE successfully receives an MBMS service in enhanced coverage.

SUMMARY OF THE INVENTION

According to a conventional cell reselection procedure, in order to receive an MBMS service, a terminal may give a priority to an SC-PTM cell or a frequency corresponding thereto and thus the terminal may select the SC-PTM cell or a frequency corresponding thereto. However, a CE level of a newly selected SC-PTM cell or a frequency corresponding thereto may be worse than a CE level of an existing cell or frequency. When a CE level in a camp-on cell becomes worse, the terminal may consume more power in receiving paging and system information or receiving an MBMS service through SC-PTM. That a CE level becomes worse means increase in the number of repetition, an amount of resources, or the number of subframes required for successful uplink transmission and downlink reception. Therefore, while efficiently using radio resources, i.e., while maintaining a CE level in a cell in which the terminal currently camps on, a cell reselection procedure is required that may receive an MBMS service of interest.

In an aspect, a method for performing, by a user equipment (UE), a cell reselection procedure in a wireless communication system includes measuring a first CE level in a serving cell on which the UE is currently camping on; measuring a second CE level in a neighboring cell that provides an MBMS service of interest; adding an offset to a measured quality value of the neighboring cell to calculate a ranking of the neighboring cell, when the second CE level is equal to or better than the first CE level; and performing a cell reselection procedure based on the calculated ranking.

The performing of a cell reselection procedure may include reselecting a cell having a high ranking for a preset time interval for performing the cell reselection procedure.

The UE may support NB-IoT, and the MBMS service may be provided through SC-PTM transmission.

The first CE level and the second CE level may be measured in a unit of an MBMS service, TMGI, or a frequency that provides the MBMS service.

The first CE level and the second CE level may be determined by comparing measured Reference Signal Received Power (RSRP) of the serving cell and the neighboring cell and a CE level related threshold value received from a network.

The CE level related threshold value may be received through an MCCH, SC-MCCH, or PDCCH.

The method may further include receiving the MBMS service of interest through the neighboring cell to which the offset is given after performing the reselection procedure; and releasing the offset given to the neighboring cell.

The method may further include initiating an RRC connection establishment procedure after the releasing of the offset.

In another aspect, a user equipment (UE) for performing a cell reselection procedure in a wireless communication system includes a memory; a transceiver; and a processor for connecting the memory and the transceiver, wherein the processor is configured to measure a first CE level in a serving cell on which the UE is currently camping on; to measure a second CE level in a neighboring cell that provides an MBMS service of interest; to add an offset to a measured quality value of the neighboring cell to calculate a ranking of the neighboring cell, when the second CE level is equal to or better than the first CE level; and to perform a cell reselection procedure based on the calculated ranking.

The processor may be configured to reselect a cell having a high ranking for a preset time interval for performing the cell reselection procedure.

The UE may support NB-IoT, and the MBMS service may be provided through SC-PTM transmission.

The processor may be configured to measure a first CE level and a second CE level in a unit of an MBMS service, TMGI, or a frequency that provides the MBMS service.

The processor may be configured to compare measured Reference Signal Received Power (RSRP) of the serving cell and the neighboring cell and a CE level related threshold value received from a network to determine the first CE level and the second CE level.

The CE level related threshold value may be transmitted to the UE through an MCCH, SC-MCCH, or PDCCH.

After performing the reselection procedure, the processor may be configured to receive the MBMS service of interest through a neighboring cell to which the offset is given and to release the offset given to the neighboring cell.

Advantageous Effects

According to embodiments of the present invention, in performing a cell reselection procedure, by considering a CE level of a new cell, radio resources can be prevented from being unnecessarily consumed.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
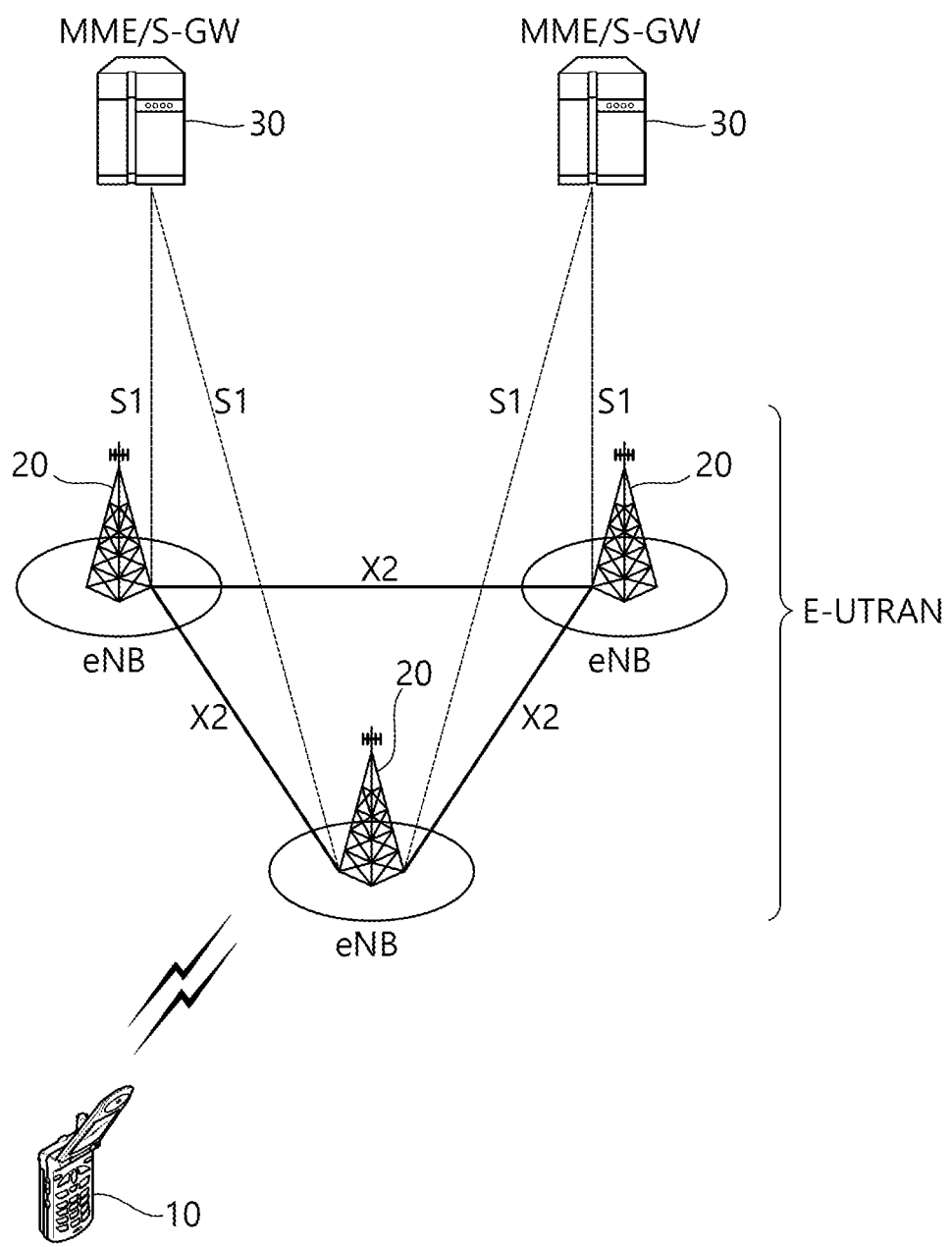
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a serving gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN, and connected to external network.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
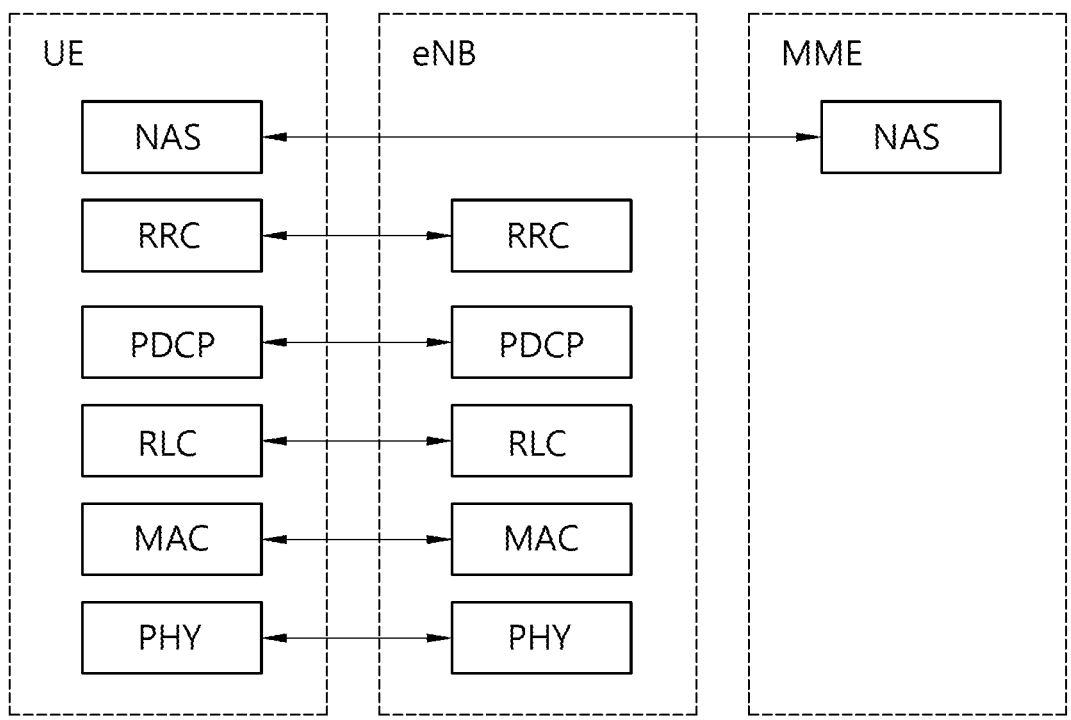
FIG. 2 shows a control plane of a radio interface protocol of an LTE system.
Figure 3:
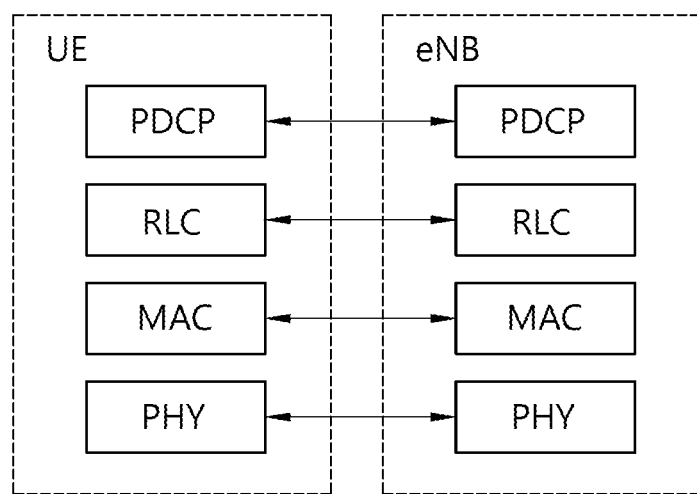
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer above the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, RRC state of UE and RRC connection method is described below.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

A non-access stratum (NAS) layer belongs to an upper layer of the RRC layer and serves to perform session management, mobility management, or the like.

In order to manage the mobility of the terminal in the NAS layer positioned on the control planes of the terminal and the MME, an EPS mobility management (EMM) registered state and an EMM deregistered state may be defined. The EMM registered state and the EMM deregistered state may be applied to the terminal and the MME. Like a case of turning on the power of the terminal for the first time, an initial terminal is in the EMM deregistered state and the terminal performs a process of registering the terminal in the corresponding network through an initial attach procedure in order to access the network. When the attach procedure is successfully performed, the terminal and the MME is transitioned to the EMM registered state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, a mobility of the UE is managed by the command of the network. If a location of the UE in the ECM-IDLE state becomes different from a location known to the network, the UE announces the location of the UE to the network through a tracking area update procedure.

Figure 4:
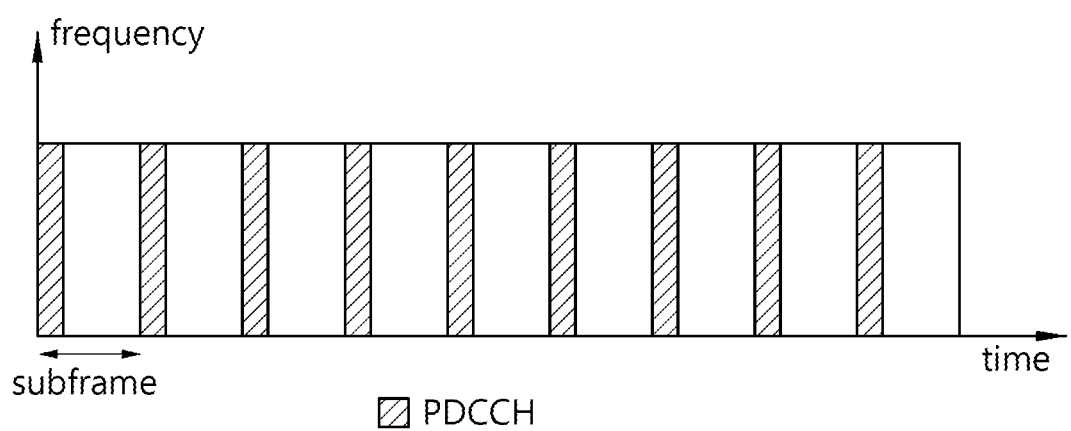
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Hereinafter, a method and procedure in which a UE selects a cell will be described.

A cell selection process is divided into two categories.

First, in an initial cell selection process, the UE does not have previous information about a radio channel. Therefore, in order to search for a suitable cell, the UE searches for all radio channels. The UE searches for a strongest cell in each channel. Thereafter, when the UE finds a suitable cell satisfying a cell selection criterion, the UE selects the corresponding cell.

Next, the UE may select a cell using stored information or using information broadcasting in the cell. Therefore, the UE may quickly select a cell, compared with the initial cell selection process. When the UE finds a cell satisfying a cell selection criterion, the UE selects the corresponding cell. When the UE does not find a suitable cell satisfying the cell selection criterion through this process, the UE performs an initial cell selection process.

After selecting any cell through the cell selection procedure, intensity or a quality of signals between the UE and the base station may be changed due to a change in mobility or a radio environment of the UE. Therefore, when a quality of the selected cell is deteriorated, the UE may select another cell providing a better quality. When the cell is again selected in this way, the UE selects a cell generally providing a better signal quality than that of the currently selected cell. This process is referred to as cell reselection. The cell reselection process has a basic object in selecting a cell providing a best quality to the UE in a quality aspect of a radio signal.

In addition to a quality aspect of a radio signal, the network may determine a priority for each frequency to notify the UE of the priority. The UE, having received such a priority considers the priority more preferentially than radio signal quality criteria in a cell reselection process.

As described above, there is a method of selecting or reselecting a cell according to signal characteristics of a radio environment, and in selecting a cell for reselection, there may be the following cell reselection methods according to RAT and frequency characteristic of the cell.

Intra-frequency cell reselection: the UE reselects a cell having the same RAT as that of a camping cell and the same center-frequency as that of a camping cell Inter-frequency cell reselection: the UE reselects a cell having the same RAT as that of a camping cell and a center-frequency different from that of a camping cell Inter-RAT cell reselection: the UE reselects a cell using RAT different from camping RAT A principle of a cell reselection process is as follows:

First, the UE measures a quality of a serving cell and a neighboring cell for cell reselection.

Second, cell reselection is performed based on cell reselection criteria. Cell reselection criteria have the following characteristics with respect to measurement of the serving cell and the neighboring cell.

Intra-frequency cell reselection is basically performed based on a ranking. The ranking is a work that defines an index value for cell reselection evaluation and that sequences cells in magnitude order of the index value using the index value. A cell having a best index is often referred to as a highest ranked cell. A cell index value is a value that applies a frequency offset or a cell offset, as needed based on a value in which a UE measures for the corresponding cell.

Inter-frequency cell reselection is performed based on a frequency priority provided by the network. The UE attempts to camp on in a frequency having a highest frequency priority. The network may provide a frequency priority to be commonly applied to UEs within a cell through broadcast signaling or may provide a priority for each frequency for each UE through dedicated signaling for each UE. A cell reselection priority provided through broadcast signaling may be referred to as a common priority, and a cell reselection priority set by a network for each UE may be referred to as a dedicated priority. When receiving the dedicated priority, the UE may together receive a validity time related to the dedicated priority. When receiving the dedicated priority, the UE starts a validity timer set to the together received validity time. While the validity timer operates, the UE applies a dedicated priority in an RRC idle mode. When the validity timer has expired, the UE discards a dedicated priority and again applies a common priority.

For inter-frequency cell reselection, the network may provide a parameter (e.g., frequency-specific offset) used for cell reselection for each frequency to the UE.

For intra-frequency cell reselection or inter-frequency cell reselection, the network may provide a neighboring cell list (NCL) to be used for cell reselection to the UE. The NCL includes a cell-specific parameter (e.g., cell-specific offset) to be used for cell reselection.

For intra-frequency or inter-frequency cell reselection, the network may provide a cell reselection black list to be used for cell reselection to the UE. For a cell included in the black list, the UE does not perform cell reselection.

Thereafter, a ranking to be performed in a cell reselection evaluation process will be described.

A ranking criterion used for giving a priority to a cell is defined to Equation 1.

$$R_s = Q_{Meas,s} + Q_{hyst}, R_n = Q_{meas,s} - Q_{offset}$$ [Equation 1]

where Rs is a ranking index of the serving cell, Rn is a ranking index of the neighboring cell, Qmeas,s is a quality value in which the UE measures for the serving cell, Qmeas,n is a quality value in which the UE measures for the neighboring cell, Qhyst is a hysteresis value for a ranking, and Qoffset is offset between two cells.

In an intra-frequency, when the UE receives Qoffsets,n between the serving cell and the neighboring cell, Qoffset=Qoffsets,n, and when the UE does not receive Qoffsets,n, Qoffset=0.

In an inter-frequency, when the UE receives Qoffsets,n of the corresponding cell, Qoffset=Qoffsets,n+Qfrequency, and when the UE does not receive Qoffsets,n, Qoffset=Qfrequency.

When a ranking index Rs of the serving cell and a ranking index Rn of the neighboring cell fluctuate in a similar state, ranking order is frequently changed as a fluctuation result and thus the UE may alternately reselect two cells. Qhyst is a parameter for preventing the UE from alternately reselecting two cells by giving a hysteresis in cell reselection.

The UE measures Rs of the serving cell and Rn of the neighboring cell, regards a cell having a highest ranking index as a highest ranked cell, and reselects the cell according to Equation 1. When the reselected cell is not a suitable cell, the UE excludes the corresponding frequency or the corresponding cell from a cell reselection target.

Multimedia broadcast multicast services (MBMS) are described.

Figure 5:
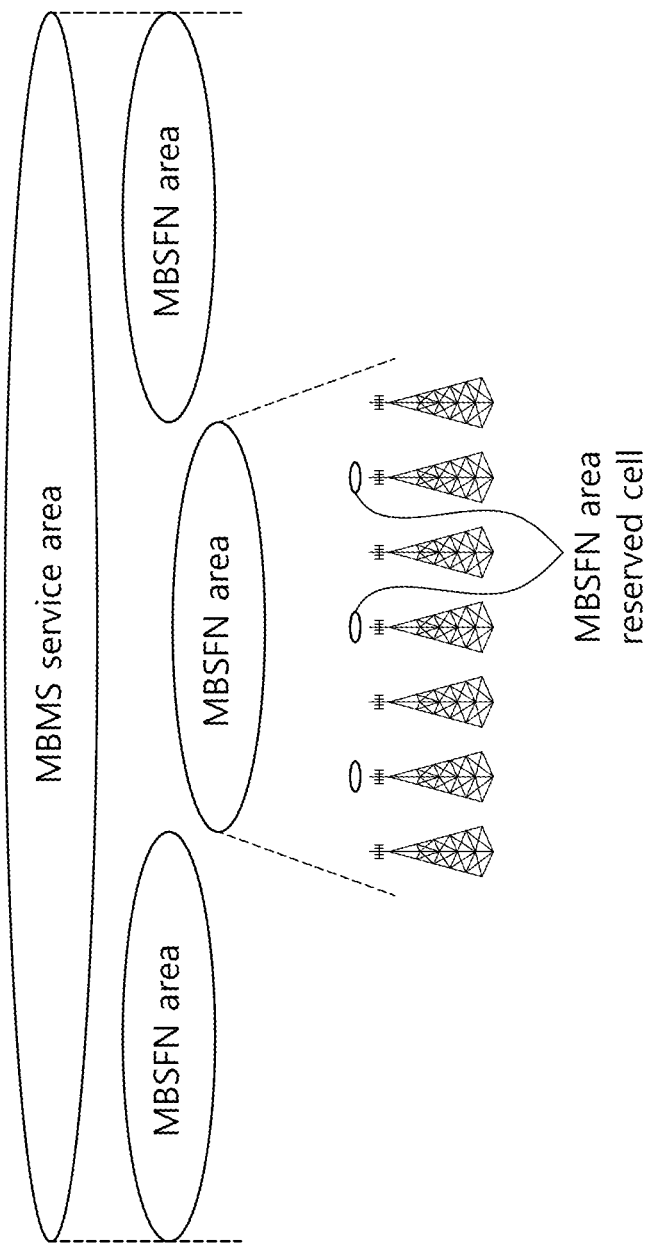
FIG. 5 shows MBMS definitions.

FIG. 5 shows MBMS definitions. For MBMS, the following definitions may be introduced.

Multicast-broadcast single-frequency network (MBSFN) synchronization area: This is an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e., when it knows which MBSFN area applies for the service(s) it is interested to receive.

MBSFN area reserved cell: This is a cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast and multicast service center (BM-SC) and the multi-cell/multicast coordination entity (MCE).

Synchronization period: The synchronization period provides the time reference for the indication of the start time of each synchronization sequence. The time stamp which is provided in each SYNC PDU is a relative value which refers to the start time of the synchronization period. The duration of the synchronization period is configurable.

Transmission of a MBMS in E-UTRAN uses either MBSFN transmission or SC-PTM transmission. The MCE makes the decision on whether to use SC-PTM or MBSFN for each MBMS session.

Figure 6:
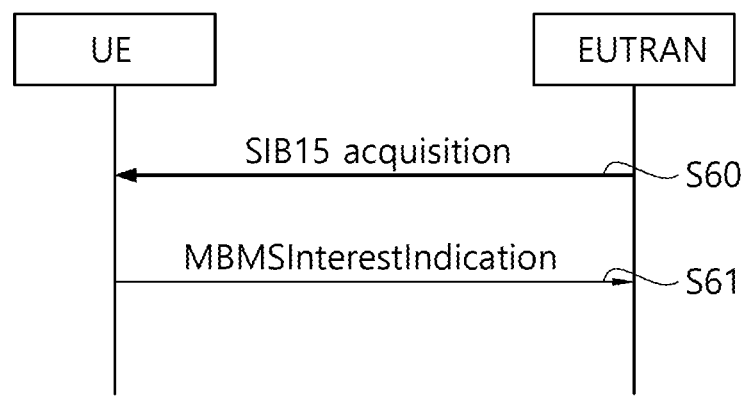
FIG. 6 shows an MBMS interest indication procedure.

FIG. 6 shows an MBMS interest indication procedure. An MBMS capable UE in RRC_CONNECTED may initiate the procedure in several cases including upon successful connection establishment, upon entering or leaving the service area, upon session start or stop, upon change of interest, upon change of priority between MBMS reception and unicast reception or upon change to a primary cell (PCell) broadcasting SystemInformationBlockType15.

Upon initiating the procedure, the UE shall:

1> if SystemInformationBlockType15 is broadcast by the PCell in step S90:

2> ensure having a valid version of SystemInformationBlockType15 for the PCell;

2> if the UE did not transmit an MBMSInterestIndication message since last entering RRC_CONNECTED; or 2> if since the last time the UE transmitted an MBMSInterestIndication message, the UE connected to a PCell not broadcasting SystemInformationBlockType15:

3> if the set of MBMS frequencies of interest is not empty:

4> initiate transmission of the MBMSInterestIndication message;

2> else:

3> if the set of MBMS frequencies of interest has changed since the last transmission of the MBMSInterestIndication message; or 3> if the prioritization of reception of all indicated MBMS frequencies compared to reception of any of the established unicast bearers has changed since the last transmission of the MBMSInterestIndication message:

4> initiate transmission of the MBMSInterestIndication message.

The UE may send an MBMSInterestIndication even when it is able to receive the MBMS services it is interested in i.e. to avoid that the network allocates a configuration inhibiting MBMS reception.

To determine MBMS frequencies of interest, the UE shall:
1> consider a frequency to be part of the MBMS frequencies of interest if the following conditions are met:
2> at least one MBMS session the UE is receiving or interested to receive via an MRB is ongoing or about to start (the UE may determine whether the session is ongoing from the start and stop time indicated in the user service description (USD)); and
2> for at least one of these MBMS sessions SystemInformationBlockType15 acquired from the PCell includes for the concerned frequency one or more MBMS service area identifiers (SAIs) as indicated in the USD for this session (the UE considers a frequency to be part of the MBMS frequencies of interest even though the E-UTRAN may (temporarily) not employ an MRB for the concerned session. i.e., the UE does not verify if the session is indicated on MCCH); and
2> the UE is capable of simultaneously receiving the set of MBMS frequencies of interest, regardless of whether a serving cell is configured on each of these frequencies or not; and
2> the supportedBandCombination the UE included in UE-EUTRA-Capability contains at least one band combination including the set of MBMS frequencies of interest.

Further, to determine MBMS services of interest, the UE shall:
1> consider an MBMS service to be part of the MBMS services of interest if the following conditions are met:
2> The UE can perform SC-PTM.
2> The UE is receiving or interested to receive the service via SC-MRB
2> one session of the service is ongoing or about to start
2> at least one MBMS SAI of USD of the service is included in SystemInformationBlockType15 obtained from a Pcell for a frequency belonging to an MBMS frequency set of interest.

Indicating a frequency implies that the UE supports SystemInformationBlockType13 acquisition for the concerned frequency, i.e., the indication should be independent of whether a serving cell is configured on that frequency. When evaluating which frequencies it can receive simultaneously, the UE does not take into account the serving frequencies that are currently configured, i.e., it only considers MBMS frequencies it is interested to receive. The term frequency does not indicate a physical frequency but covers the associated band(s), noting that additional bands may be indicated in SystemInformationBlockType1 (serving frequency) or SystemInformationBlockType15 (neighboring frequencies).

The UE shall set the contents of the MBMSInterestIndication message as follows:
1> if the set of MBMS frequencies of interest is not empty:
2> include mbms-FreqList and set it to include the MBMS frequencies of interest, using the E-UTRA absolute radio frequency channel number (EARFCN) corresponding with freqBandIndicator included in SystemInformationBlockType1, if applicable, and the EARFCN(s) as included in SystemInformationBlockType15. The mbms-FreqList merely indicates the physical frequencies the UE is interested to receive and does not imply the UE supports the associated band.

2> include mbms-Priority if the UE prioritizes reception of all indicated MBMS frequencies above reception of any of the unicast bearers. If the UE prioritizes MBMS reception and unicast data cannot be supported because of congestion on the MBMS carrier(s), the E-UTRAN may initiate release of unicast bearers. It is up to E-UTRAN implementation whether all bearers or only GBR bearers are released. The E-UTRAN does not initiate re-establishment of the released unicast bearers upon alleviation of the congestion.

The UE shall submit the MBMSInterestIndication message to lower layers for transmission. Accordingly, in step S91, the UE transmits the MBMSInterestIndication message to the E-UTRAN.

Figure 7:
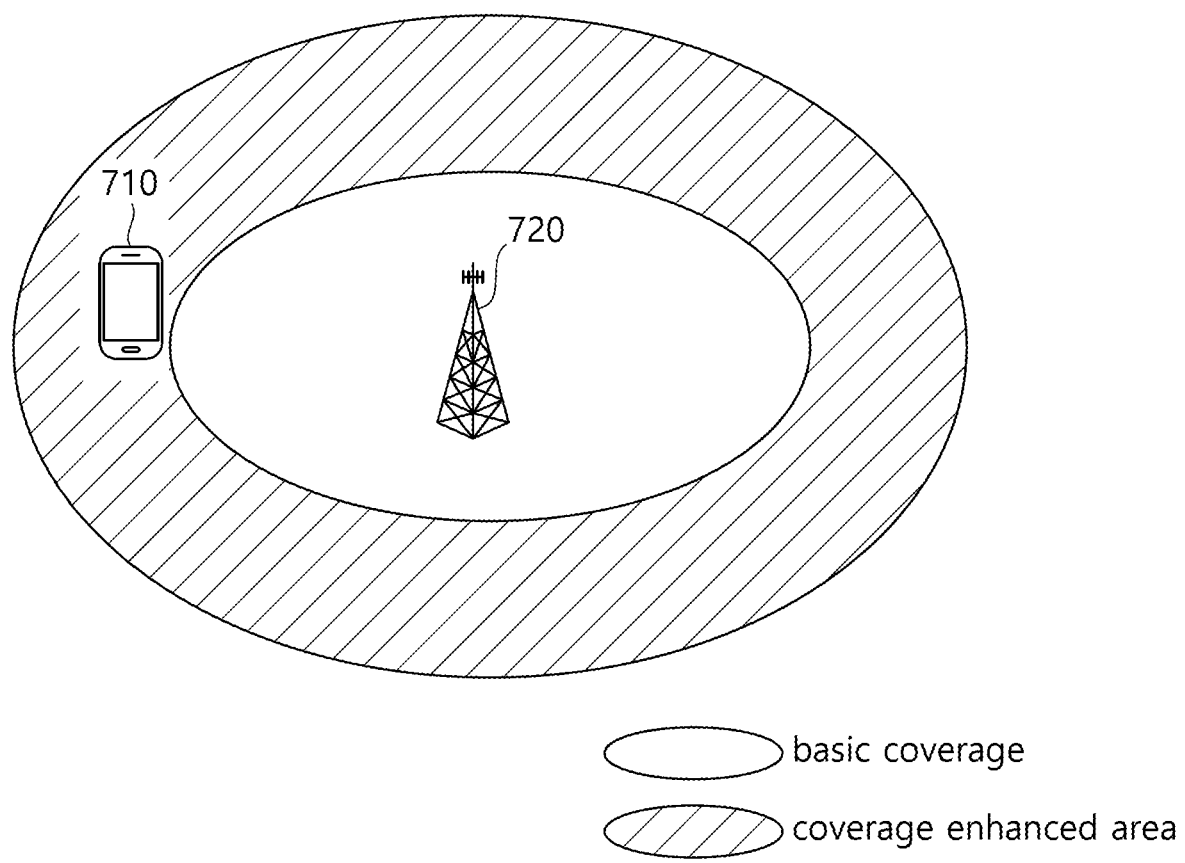
FIG. 7 shows an example of cell coverage enhancement.

FIG. 7 shows an example of cell coverage enhancement.

Recently, various coverage enhancement techniques, such as a repeated transmission method for a UE 710 per channel/signal, have been discussed. A coverage enhancement level (hereinafter, "CE level") may change depending on the location of a UE in a cell and the signal quality of the UE in the cell. A different CE level refers to a different number of repetitions (resources or subframes) required for successful uplink transmission and downlink reception. For a UE, it is advantageous in view of power consumption to stay in a cell requiring a smaller number of repetitions for successful uplink transmission and downlink reception. A smaller number of repetitions for successful uplink transmission and downlink reception may be needed particularly for an MTC UE. The MTC UE refers to a wireless device that provides MTC communication, and MTC communication refers to an information exchange between MTC UEs via a BS, which does not involve human interaction or an information exchange between an MTC UE and an MTC server through a BS. For a network, it is also advantageous to serve a UE that requires a smaller number of repetitions.

In the present invention, it is assumed that there is a plurality of CE levels for measurement including a level corresponding to no coverage enhancement. Further, it is assumed that the number of repetitions required for successful uplink transmission and downlink reception changes according to the CE level. The number of repetitions may be the amount of resources required for successful uplink transmission and downlink reception or may be the number of subframes required for successful uplink transmission and downlink reception. CE level 0 corresponds to no coverage enhancement, and the number of repetitions, the amount of resources, or the number of subframes required for successful uplink transmission and downlink reception may be increased as the CE level increases.

The UE may determine a CE level for transmission and reception in a particular cell using the following methods, and each threshold value may be provided by a serving cell.

(1) Determination of CE level based on RSRP/RSRQ: The UE may determine the CE level of a cell by comparing a measured RSRP/RSRQ result with a preset threshold value.

A network may set an RSRP/RSRQ threshold value for one or more CE levels so that the UE determines a CE level in a particular cell. For example, the network may signal a zeroth RSRP/RSRQ threshold value to distinguish CE level 0 from CE level 1, a first RSRP/RSRQ threshold value to distinguish CE level 1 from CE level 2, and a second RSRP/RSRQ threshold value to distinguish CE level 2 from CE level 3. Level 0 means that there is no coverage enhancement for measurement.

While measuring the serving cell and a neighboring cell, the UE may determine a CE level by comparing the RSRP/RSRQ result measured by the UE with the threshold value set by the network. When the measured result is lower than a third RSRP/RSRQ threshold value and is higher than a second RSRP/RSRQ threshold value and the UE may support a CE level 3, the UE may determine the CE level to 3. When the measured result is lower than a second RSRP/RSRQ threshold value and is higher than a first RSRP/RSRQ threshold value and the UE may support a CE level 2, the UE may determine the CE level to 2. When the measured result is lower than a first RSRP/RSRQ threshold value and is higher than a zero RSRP/RSRQ threshold value and the UE may support a CE level 1, the UE may determine the CE level to 1. Similarly, when the measured result is lower than a zero RSRP/RSRQ threshold value and the UE may support a CE level 0, the UE may determine the CE level to 0.

(2) Determination of CE level based on primary synchronization signal (PSS)/secondary synchronization signal (SSS): The UE may determine the CE level of a cell by comparing the time to obtain PSS/SSS with a preset threshold value.

The network may set a time threshold value for one or more CE levels so that the UE determines a CE level in a particular cell. For example, the network may signal a zeroth time threshold value to distinguish CE level 0 from CE level 1, a first time threshold value to distinguish CE level 1 from CE level 2, and a second time threshold value to distinguish CE level 2 from CE level 3. Level 0 means that there is no coverage enhancement for measurement.

While measuring the serving cell and a neighboring cell, the UE may determine the CE level by comparing the time to obtain PSS/SSS with the time threshold value set by the network. When the time to obtain PSS/SSS is lower than the zeroth time threshold value, the UE may determine the CE level to be 0. When the time to obtain PSS/SSS is longer than the zeroth time threshold value and is shorter than the first time threshold value, the UE may determine the CE level to be 1. When the time to obtain PSS/SSS is longer than the first time threshold value and is shorter than the second time threshold value, the UE may determine the CE level to be 2. Similarly, when the time to obtain PSS/SSS is longer than the second time threshold value, the UE may determine the CE level to be 3.

(3) Determination of CE level based on downlink message: The UE may determine the CE level of a cell by comparing the number of repetitions required to successfully receive a downlink message with a preset threshold value.

(4) Determination of CE Level Based on uplink message: The UE may determine the CE level of a cell by comparing the number of repetitions required to successfully transmit an uplink message with a preset threshold value.

In this description, it is assumed that the CE level may be set to 0 to 3, without being limited thereto. Instead, it is to be understood that one or more levels may be set.

According to a conventional cell reselection procedure, in order to receive an MBMS service, the UE may give a priority to an SC-PTM cell or a frequency corresponding thereto and thus the UE may select the SC-PTM cell or a frequency corresponding thereto. However, a CE level of a newly selected SC-PTM cell or a frequency corresponding thereto may become worse than a CE level of an existing cell or frequency. When a CE level in a staying cell becomes worse, the UE may consume more power in receiving paging and system information or receiving an MBMS service through SC-PTM. That a CE level becomes worse means increase in the number of repetition, an amount of resources, or the number of subframes required for successful uplink transmission and downlink reception. For example, because the CE level 3 requires many repetition number than the CE level 1, the CE level 3 is worse than the CE level 1. Therefore, while efficiently using radio resources, i.e., while maintaining a CE level in a cell in which the UE currently stays, a cell reselection procedure that may receive an MBMS service of interest is required.

Figure 8:
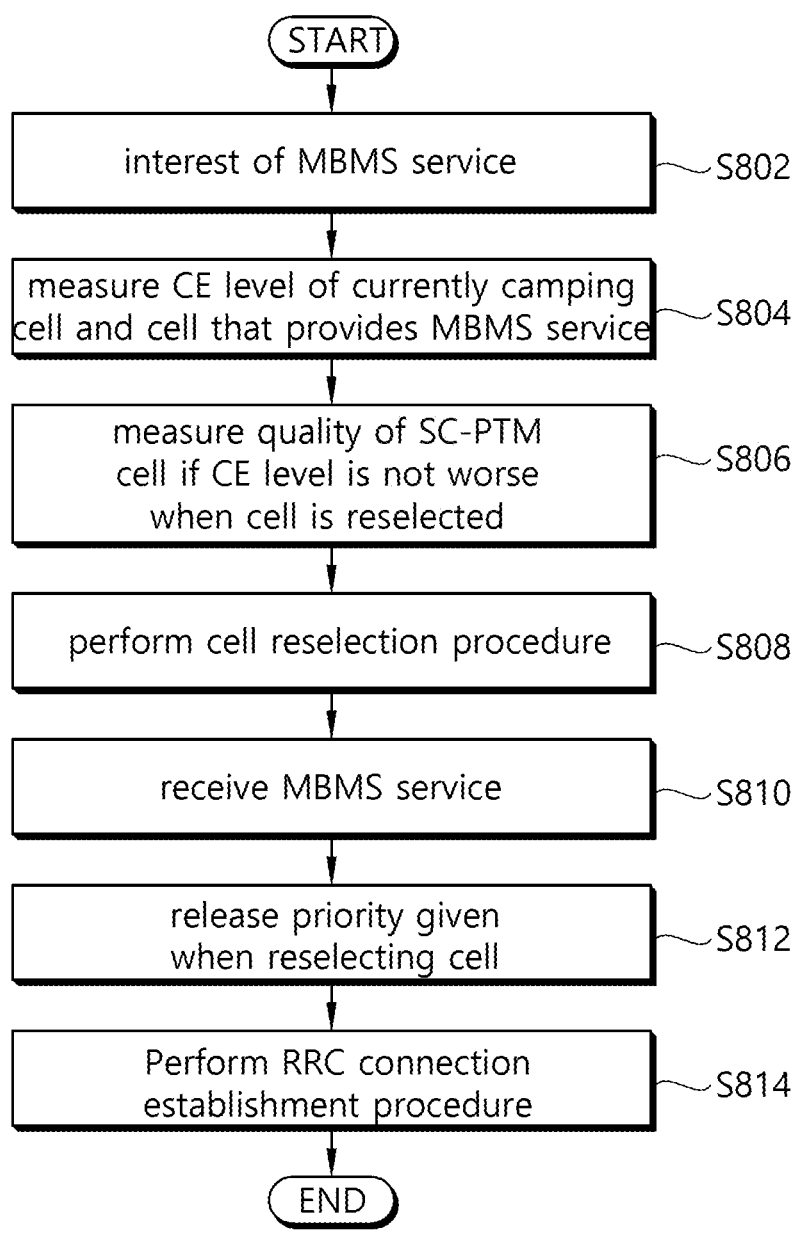
FIG. 8 is a flowchart illustrating a method in which a terminal performs a cell reselection procedure according to an embodiment of the present invention.

Hereinafter, a method of performing a cell reselection procedure according to an embodiment of the present invention will be described. FIG. 8 is a flowchart illustrating a method of performing a cell reselection procedure according to an embodiment of the present invention. The UE may be interested in receiving the MBMS service. The UE may measure a CE level in a currently staying cell and a CE level in a neighboring cell that provides an MBMS service of interest. If the measured CE level in the neighboring cell is not worse than a CE level in a currently staying cell, the UE may measure a quality of an SC-PTM cell/MBMS frequency that provides the MBMS service. Thereafter, the UE may select the SC-PTM cell or the MBMS frequency through a cell reselection procedure to stay in the SC-PTM or MBMS frequency. In the cell reselection procedure, the UE may give a priority to the SC-PTM cell or the MBMS frequency. Thereafter, the UE may receive an MBMS service of interest through SC-PTM or MBSFN transmission.

Before initiating an RRC connection establishment procedure, the UE may release the given priority to lower the priority of the SC-PTM cell or the MBMS frequency. Thereafter, the UE may perform a cell reselection to stay in a non-SC-PTM cell or non-MBMS frequency. Thereafter, the UE may initiate the RRC connection establishment procedure.

Hereinafter, the foregoing each step will be described in detail with reference to FIG. 8.

In step S802, the UE may be interested in receiving an MBMS service. A UE according to the present embodiment may be a NB-IoT UE. The NB-IoT UE may receive an MBMS service of interest through SC-PTM transmission.

In step S804, the UE may measure a CE level in a currently camping on cell and a CE level in a neighboring cell that provides an MBMS service of interest.

In step S806, if the measured CE level in the neighboring cell is not worse than the CE level in a currently camping on cell, the UE may measure a quality of an SC-PTM cell/MBMS frequency providing the MBMS service using one of the following options.

Option 1: In a cell reselection procedure based on a ranking, the UE gives an offset to the SC-PTM cells Option 2: The UE performs a cell reselection procedure based on a ranking to only the SC-PTM cell having a quality of a specific threshold value or more Option 3: The UE performs a cell reselection procedure based on a ranking only to the SC-PTM cell Option 4: The UE gives a highest priority to the SC-PTM cell or MBMS frequency According to a first embodiment of the option 1 of the present invention, a ranking criterion used for giving a priority to a cell is defined to Equation 2.

$$R_s = Q_{meas,s} + Q_{hyst} - Q_{offsettemp} + Q_{offsetSCPTM}, R_n = Q_{meas,s} - Q_{offset} - Q_{offsettemp} + Q_{offsetSCPTM}$$ [Equation 2]

where Qoffsettemp is an offset temporarily applied to the cell. Further, QoffsetSCPTM is an offset applied to the cell that provides the MBMS service, and when the serving cell provides an MBMS service, the UE may give QoffsetSCPTM to the serving cell, otherwise, the UE does not give QoffsetSCPTM to the serving cell. Further, when the neighboring cell provides an MBMS service, the UE may give QoffsetSCPTM to the neighboring cell, otherwise, the UE does not give QoffsetSCPTM to the neighboring cell.

Rs is a ranking index of the serving cell, Rn is a ranking index of the neighboring cell, Qmeas,s is a quality value in which the UE measures for the serving cell, Qmeas,n is a quality value in which the UE measures for the neighboring cell, Qhyst is a hysteresis value for a ranking, and Qoffset is an offset between two cells.

The UE measures Rs of the serving cell and Rn of the neighboring cell, regards a cell having a largest ranking index value as a highest ranked cell, and reselects the cell according to Equation 2. When the reselected cell is not a suitable cell, the UE excludes from the corresponding frequency or the corresponding cell from a cell reselection target.

The UE should perform a ranking of all cells satisfying a cell selection criterion, but may not perform a ranking of a cell known to no CGS member cell.

When the following conditions are satisfied, the UE may reselect a new cell.

A ranking of a new cell is higher than that of the serving cell for time interval TreselectionRAT.

One second or more has elapsed after the UE stays in the current serving cell.

A CE level in the new cell is not worse than that in the serving cell (however, such a condition is valid only when QoffsetSCPTM is given to Rn in a cell ranking index).

According to a second embodiment of the option 1 of the present invention, the cell reselection procedure may be performed as follows.

The UE stays in a cell A. The UE is interested in receiving an MBMS service, but the cell A does not provide the MBMS service, and the MBMS service may be provided through SC-PTM transmission in cells B and C.

A CE level at a current cell A of the UE is 0 (normal coverage (NC)). The UE estimates a CE level thereof in the cells B and C. CE levels estimated in the cells B and C may be 2 and NC, respectively.

Because a CE level in the cell C (=CE level OC) is not worse than the current CE level (=CE level 0), the UE applies an SCPTM offset to the cell C.

Because a CE level (=CE level 2) in the cell B is worse than a CE level (=CE level 0) in the current cell, the UE does not apply an SCPTM offset to the cell B.

After the SC-PTM offset is applied, the UE performs a cell reselection procedure.

If a ranking of the cell C is higher than that of the cell A for a time interval TreselectionRAT, the UE may reselect the cell C. Thereafter, the UE receives an MBMS service from the cell C.

According to a first embodiment of the option 4 of the present invention, the cell selection procedure may be performed as follows.

When the UE may support continuity of an MBMS service or receive SC-PTM, extend coverage, receive the MBMS service or intend to receive the MBMS service, and receive the MBMS service only while the UE camps on a frequency in which the MBMS service is provided, if the following three conditions are satisfied, the UE may regard the frequency as a highest priority during an MBMS session.

Condition 1:
When the UE may support MBMS service continuity, and a reselected cell broadcasts SIB13; or
When the UE may receive SC-PTM and the reselected cell broadcasts SIB20;

Condition 2:
When SIB15 of the serving cell indicates at least one MBMS SAI included in MBMS User Service Description (USD) of the service for a frequency; or
When SIB15 is not broadcast in the serving cell and the frequency is included in USD of the service;
Condition 3:
A CE level of the UE in a selected cell after giving a priority to the MBMS frequency is not worse than that in a previous cell.

According to a second embodiment of the option 4 of the present invention, step S806 may be performed as follows.

The UE stays in a cell A. The UE is interested in receiving an MBMS service, but the cell A does not provide the MBMS service. The MBMS service may be provided through SC-PTM transmission in cells B and C.

It is assumed that a CE level at the current cell A of the UE is 1. The UE calculates a CE level in the cells B and C. It is assumed that CE levels calculated in the cells B and C are 3 and 1, respectively.

Because a CE level (=CE level 1) in the cell C is not lower than the CE level (=CE level 1) in the current cell, the UE regards a frequency of the cell C as a highest priority.

Because a CE level (=CE level 3) of the cell B is lower than the current CE level (=CE level 1), the UE does not regard a frequency of the cell B as a highest priority.

The UE regards a frequency of the cell C as a highest priority and then performs a cell reselection procedure. The UE reselects the cell C and receives an MBMS service from the cell C.

In step S808, by performing a cell reselection procedure, the UE may stay in the SC-PTM or MBMS frequency.

In step S810, the UE may receive an MBMS service of interest through SC-PTM transmission or MBSFN transmission.

In step S812, before initiating an RRC connection establishment procedure, by releasing a priority given through any one of the above-described options 1 to 4, the UE may lower a priority of the SC-PTM cell or the MBMS frequency. According to an embodiment, when the UE, having received the MBMS service receives a paging message, the UE may lower the priority of the SC-PTM cell or the MBMS frequency. Thereafter, in steps S814, the UE may perform the cell reselection procedure and transmit the RRC connection request message to a new cell.

In step S814, by performing cell reselection, the UE may stay in a non-SC PTM cell or a non-MBMS frequency. Thereafter, the UE may initiate an RRC connection establishment procedure.

Figure 9:
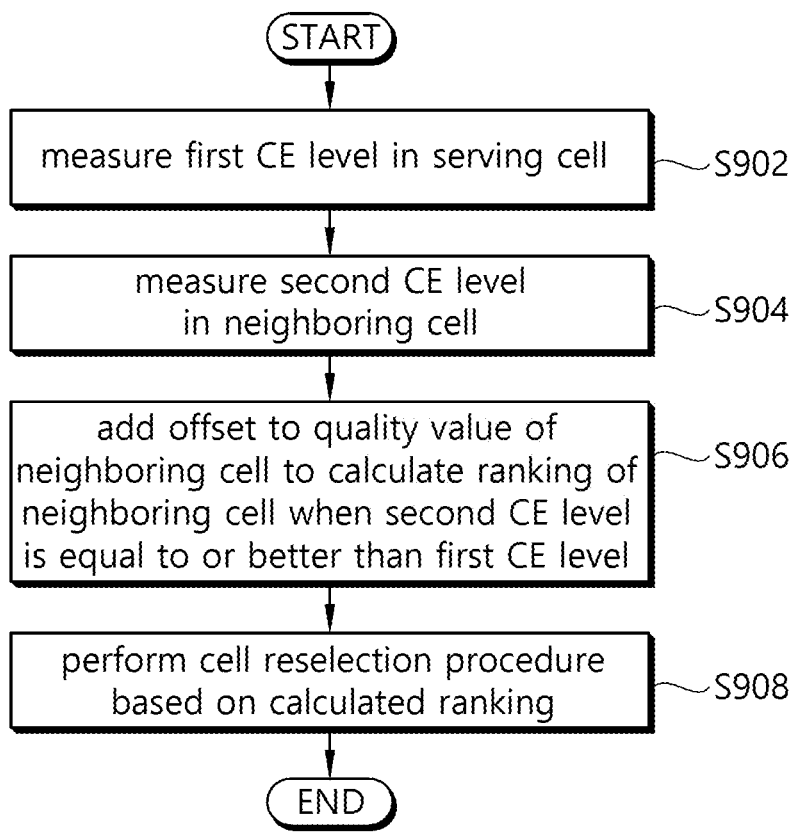
FIG. 9 is a flowchart illustrating a method in which a terminal performs a cell reselection procedure according to an embodiment of the present invention.

FIG. 9 is a flowchart illustrating a cell reselection procedure according to an embodiment of the present invention. In the present embodiment, the UE may be a NB-IoT UE, and the UE may receive an MBMS service of interest through SC-PTM transmission.

In step S902, the UE may measure a first CE level in a serving cell in which the UE currently stays. According to an embodiment, the first CE level may be measured in a unit of an MBMS service, TMGI, or a frequency that provides the MBMS service. Further, the UE may compare measured Reference Signal Received Power (RSRP) of the serving cell and a CE level related threshold value received from a network to determine a first CE level. Here, the CE level related threshold value may be received through an MCCH, SC-MCCH, or PDCCH.

In step S904, the UE may measure a second CE level in a neighboring cell in which the MBMS service of interest is provided. According to an embodiment, the second CE level may be measured in a unit of an MBMS service, TMGI, or a frequency that provides the MBMS service. Further, the UE may compare measured Reference Signal Received Power (RSRP) of the neighboring cell and a CE level related threshold value received from the network to determine the second CE level. Here, the CE level related threshold value may be received through a MCCH, SC-MCCH, or PDCCH.

In step S906, when the second CE level is equal to or superior to the first CE level, the UE may add an offset to a measured quality value of the neighboring cell to calculate a ranking of the neighboring cell. That the second CE level is equal to or superior to the first CE level means that a magnitude of the CE level (e.g., CE level 1 or CE level 3) is the same or small.

In step S908, the UE may perform a cell reselection procedure based on the calculated ranking. The cell reselection procedure may be performed based on a ranking among a plurality of cells to be a target of reselection. Specifically, the cell reselection procedure may reselect a cell having a high ranking for a preset time interval for performing the cell reselection procedure.

Figure 10:
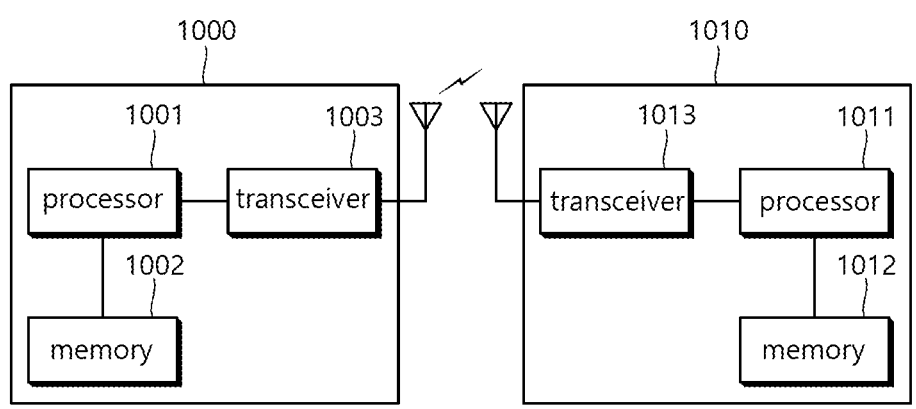
FIG. 10 is a block diagram illustrating a wireless communication system in which an embodiment of the present invention is implemented.

FIG. 10 is a block diagram illustrating a wireless apparatus in which an embodiment of the present invention can be implemented.

A BS 1000 includes a processor 1001, a memory 1002, and a radio frequency (RF) unit 1003. The memory 1002 is coupled to the processor 1001, and stores a variety of information for driving the processor 1001. The RF unit 1003 is coupled to the processor 1001, and transmits and/or receives a radio signal. The processor 1001 implements the proposed functions, procedures, and/or methods. In the aforementioned embodiments, an operation of the BS may be implemented by the processor 1001.

A UE 1010 includes a processor 1011, a memory 1012, and an RF unit 1013. The memory 1012 is coupled to the processor 1011, and stores a variety of information for driving the processor 1011. The RF unit 1013 is coupled to the processor 1011, and transmits and/or receives a radio signal. The processor 61 implements the proposed functions, procedures, and/or methods. In the aforementioned embodiments, an operation of the UE 1010 may be implemented by the processor 1011.

The processors 1011 may include application-specific integrated circuit (ASIC), other chipset, logic circuit and/or data processing device. The memories may include read-only memory (ROM), random access memory (RAM), flash memory, memory card, storage medium and/or other storage device. The RF units may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for performing, by a user equipment (UE), a cell reselection procedure in a wireless communication system, the method comprising:
measuring a first CE level in a serving cell on which the UE is currently camping;
measuring a second CE level in a neighboring cell that provides an MBMS service of interest;
adding an offset to a measured quality value of the neighboring cell to calculate a ranking of the neighboring cell, based on the second CE level being equal to or better than the first CE level;
performing a cell reselection procedure based on the calculated ranking;
receiving the MBMS service of interest through the neighboring cell to which the offset is given after performing the reselection procedure; and
releasing the offset given to the neighboring cell.

2. The method of claim 1, wherein the performing of a cell reselection procedure comprises reselecting a cell having a high ranking for a preset time interval for performing the cell reselection procedure.

3. The method of claim 1, wherein the UE supports NB-IoT, and
the MBMS service is provided through SC-PTM transmission.

4. The method of claim 1, wherein the first CE level and the second CE level are measured in a unit of an MBMS service, TMGI, or a frequency that provides the MBMS service.

5. The method of claim 1, wherein the first CE level and the second CE level are determined by comparing measured Reference Signal Received Power (RSRP) of the serving cell and the neighboring cell and a CE level related threshold value received from a network.

6. The method of claim 5, wherein the CE level related threshold value is received through an MCCH, SC-MCCH, or PDCCH.

7. The method of claim 1, further comprising initiating an RRC connection establishment procedure after the releasing of the offset.

8. A user equipment (UE) configured to perform a cell reselection procedure in a wireless communication system, the UE comprising:
a memory;
a transceiver; and
a processor for connecting the memory and the transceiver,
wherein the processor is configured to:
measure a first CE level in a serving cell on which the UE is currently camping;
measure a second CE level in a neighboring cell that provides an MBMS service of interest;

add an offset to a measured quality value of the neighboring cell to calculate a ranking of the neighboring cell, based on the second CE level being equal to or better than the first CE level;

perform a cell reselection procedure based on the calculated ranking;

receive the MBMS service of interest through the neighboring cell to which the offset is given after performing the reselection procedure; and release the offset given to the neighboring cell.

9. The UE of claim 8, wherein the processor is configured to reselect a cell having a high ranking for a preset time interval for performing the cell reselection procedure.

10. The UE of claim 8, wherein the UE supports NB-IoT, and the MBMS service is provided through SC-PTM transmission.

11. The UE of claim 8, wherein the processor is configured to measure a first CE level and a second CE level in a unit of an MBMS service, TMGI, or a frequency that provides the MBMS service.

12. The UE of claim 8, wherein the processor is configured to compare measured Reference Signal Received Power (RSRP) of the serving cell and the neighboring cell and a CE level related threshold value received from a network to determine the first CE level and the second CE level.

13. The UE of claim 12, wherein the CE level related threshold value is transmitted to the UE through a MCCH, SC-MCCH, or PDCCH.

* * * * *